Aug. 13, 1957 W. R. LINDSAY 2,802,406
AUTOMATIC ADJUSTABLE PARTITION MACHINE
Filed Oct. 6, 1954 10 Sheets-Sheet 4
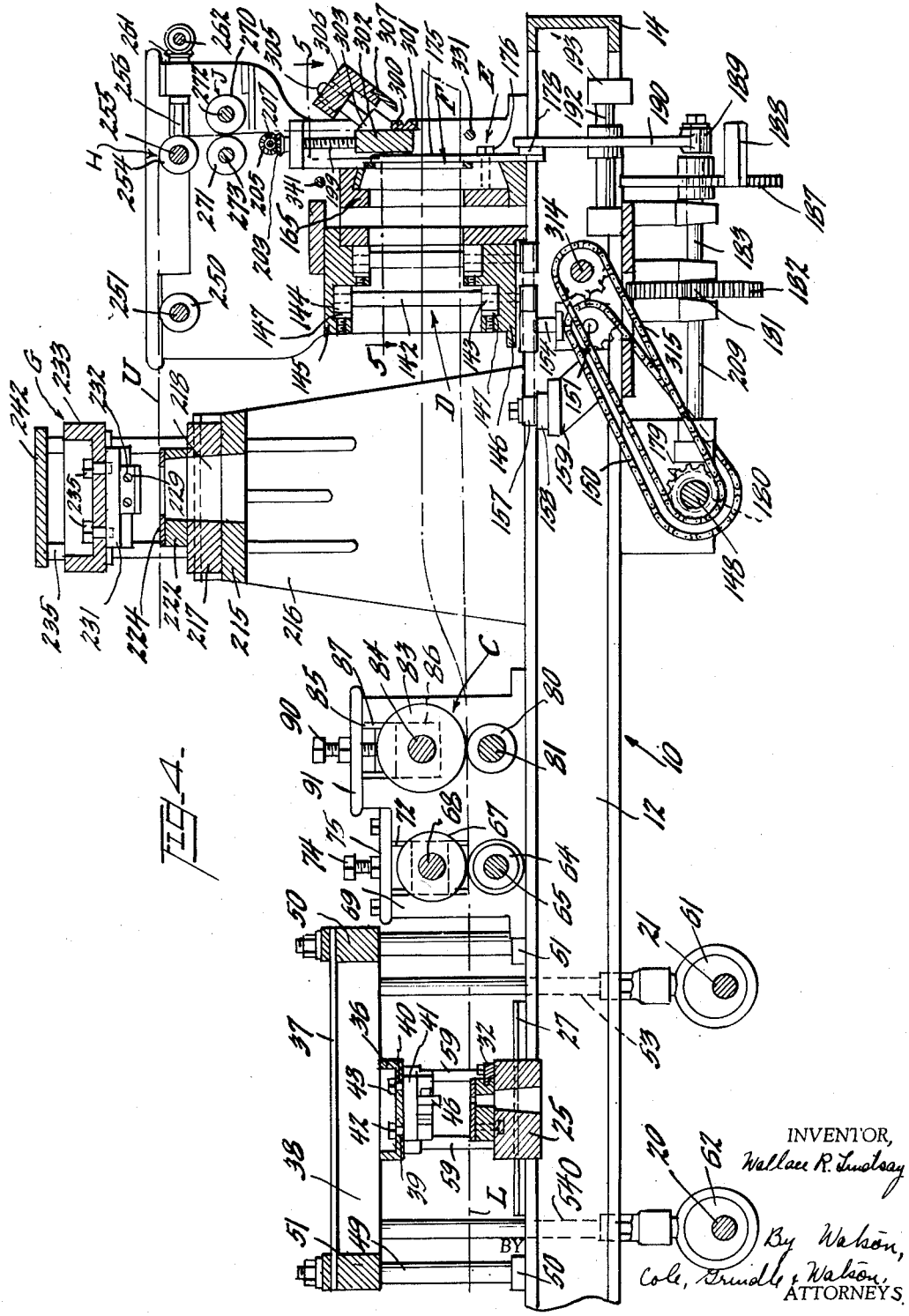
INVENTOR,
Wallace R. Lindsay
BY Watson,
Cole, Grindle & Watson,
ATTORNEYS.

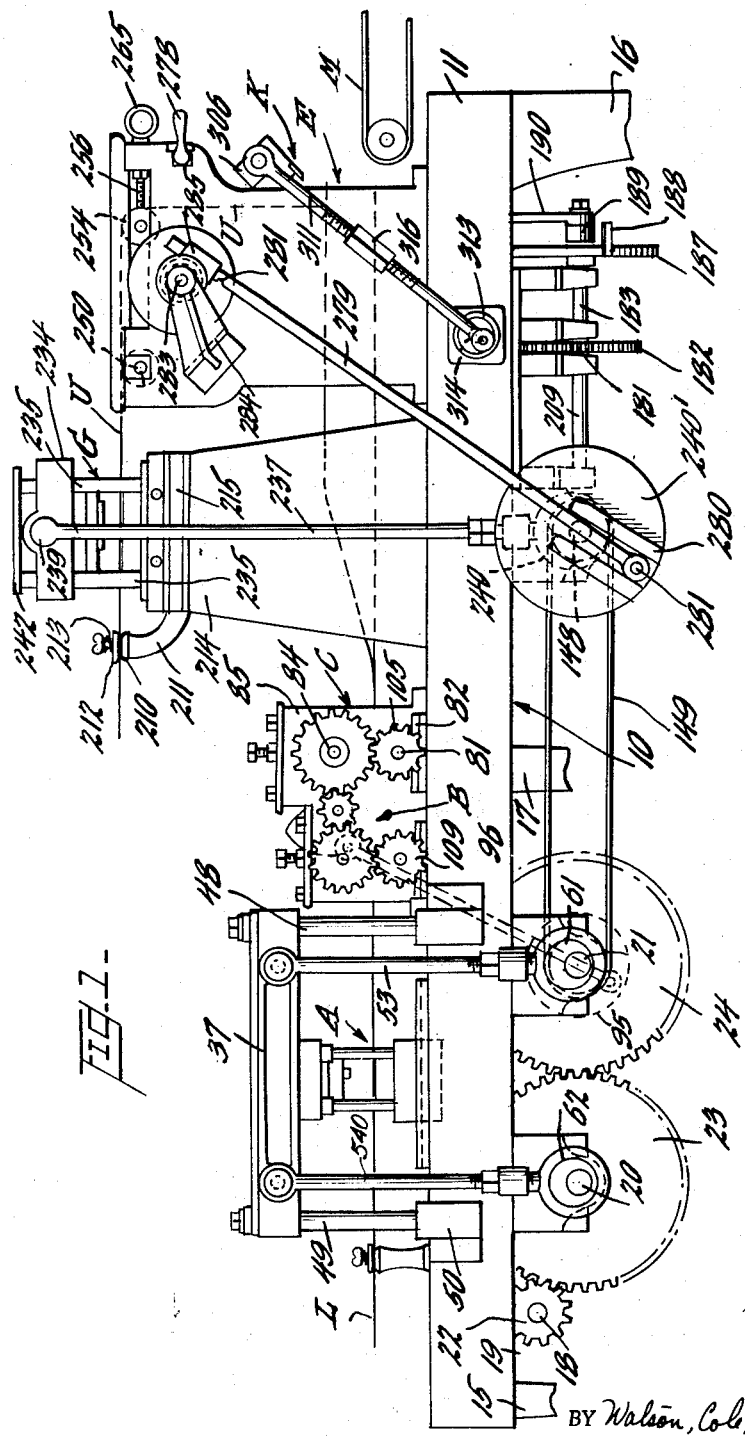

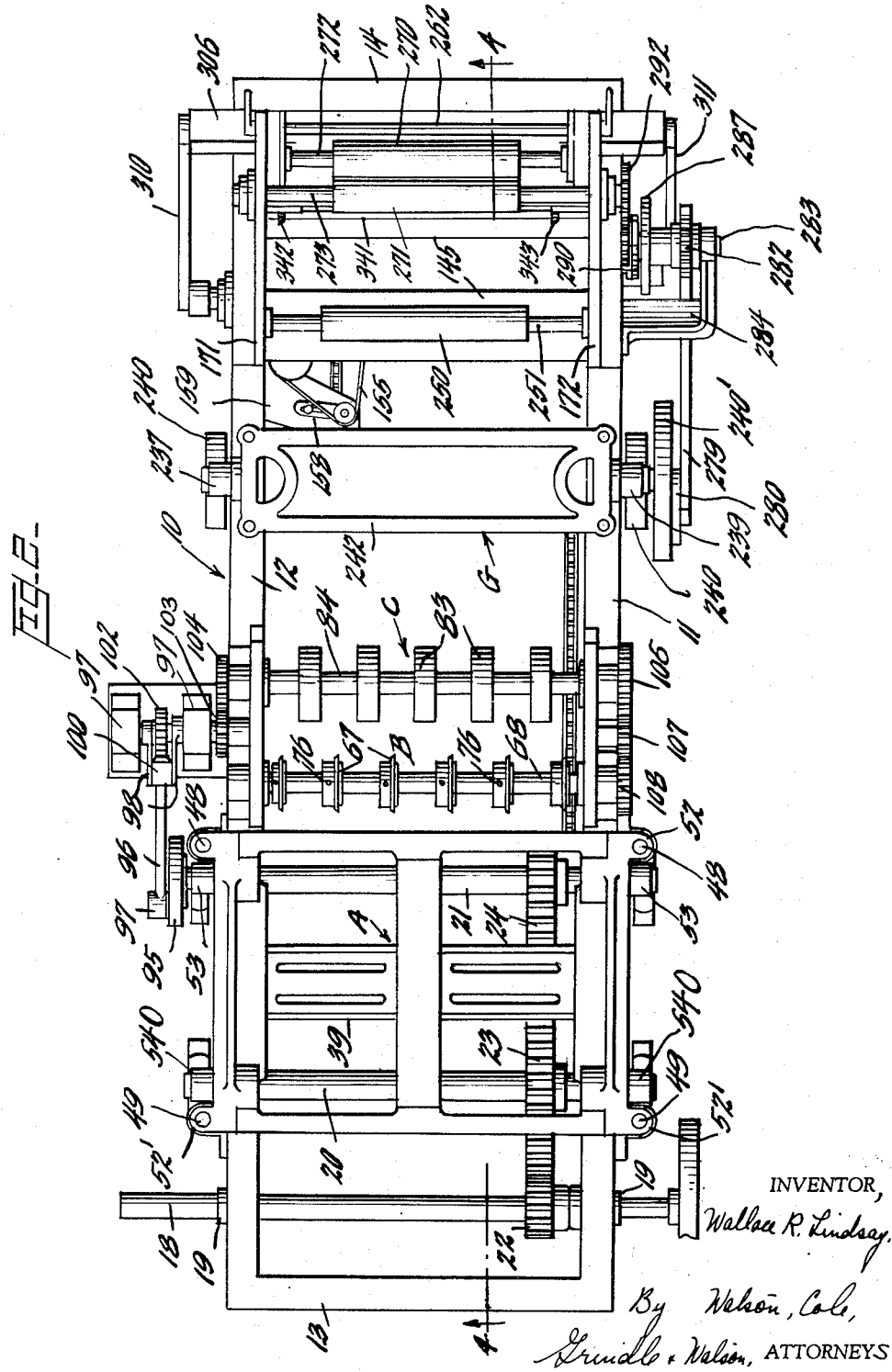

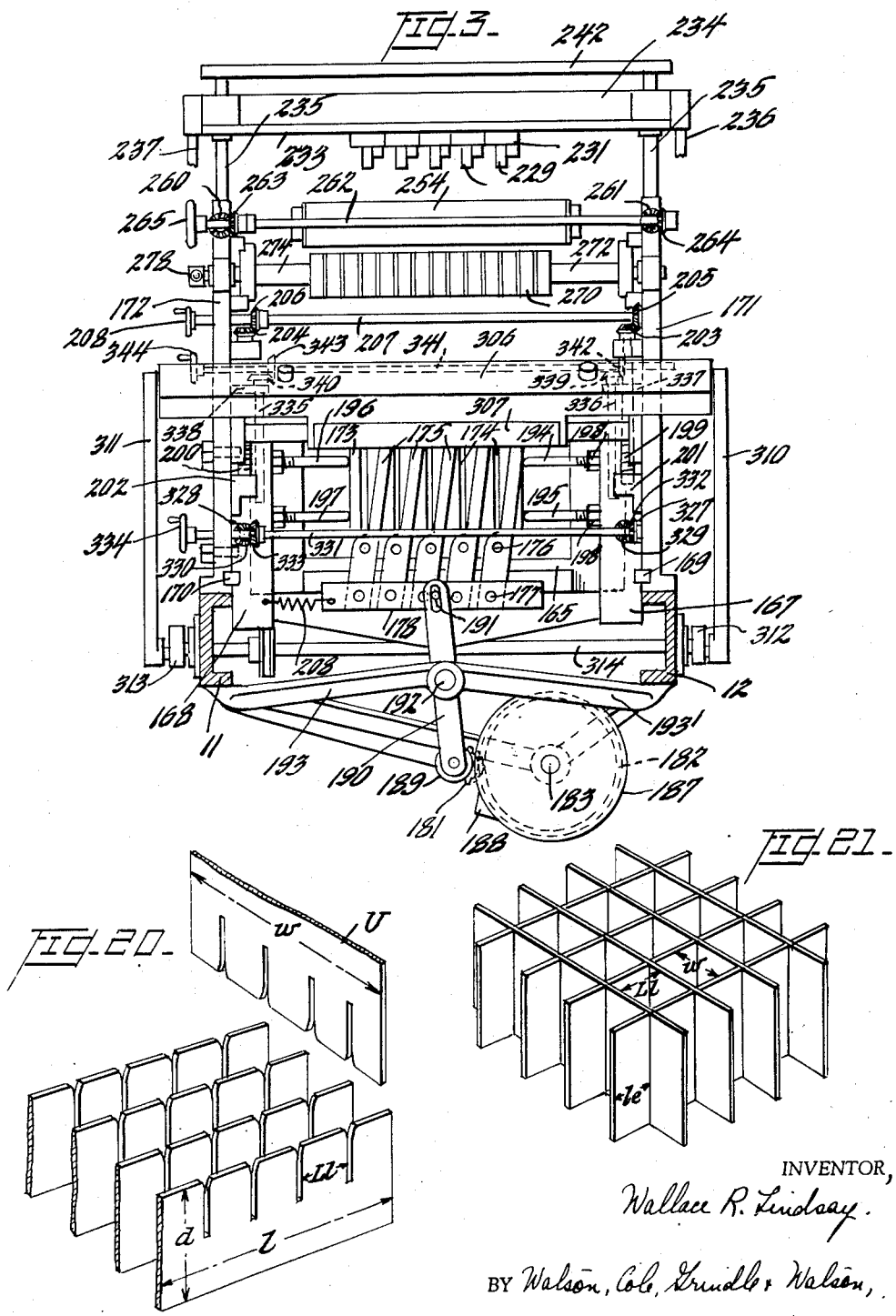

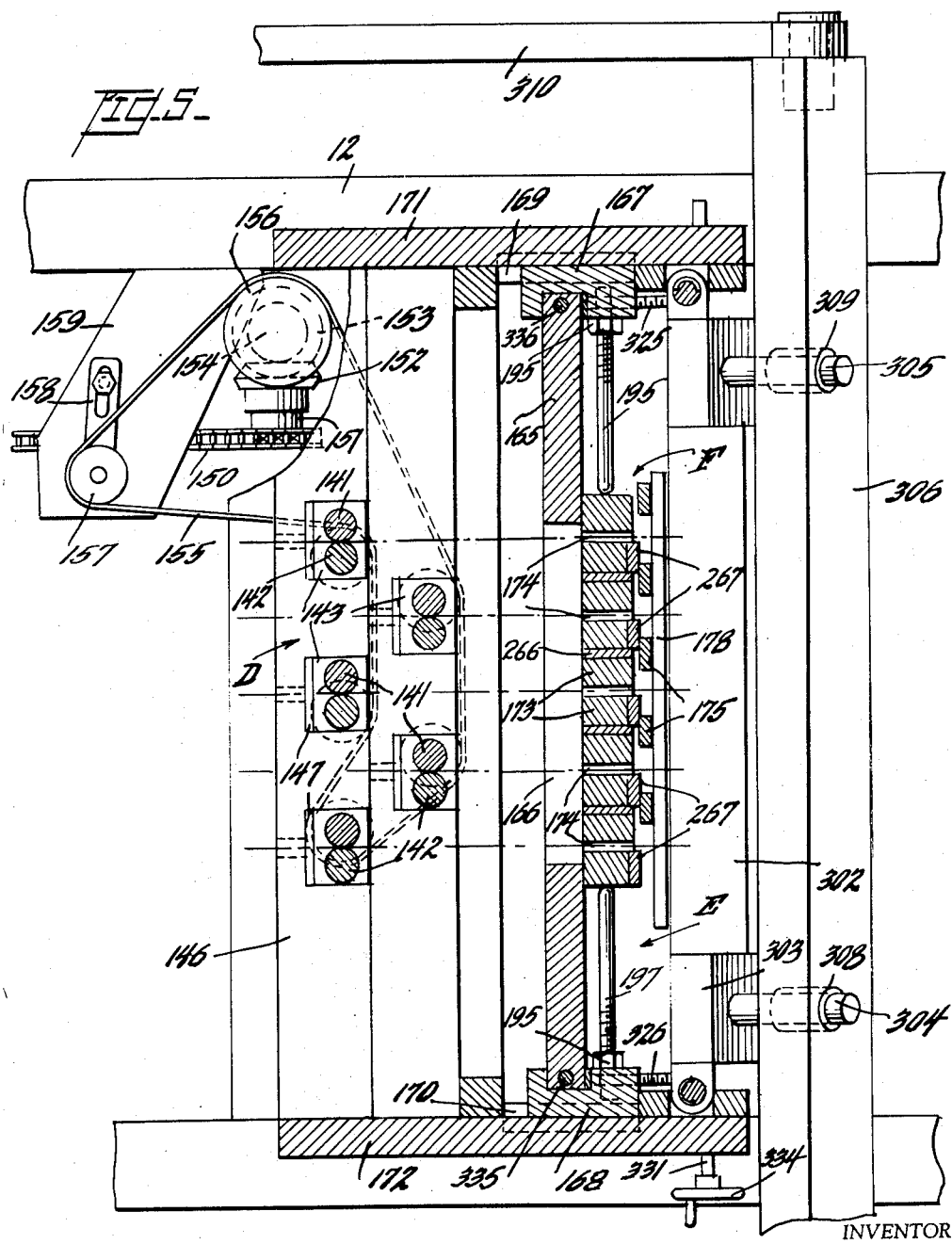

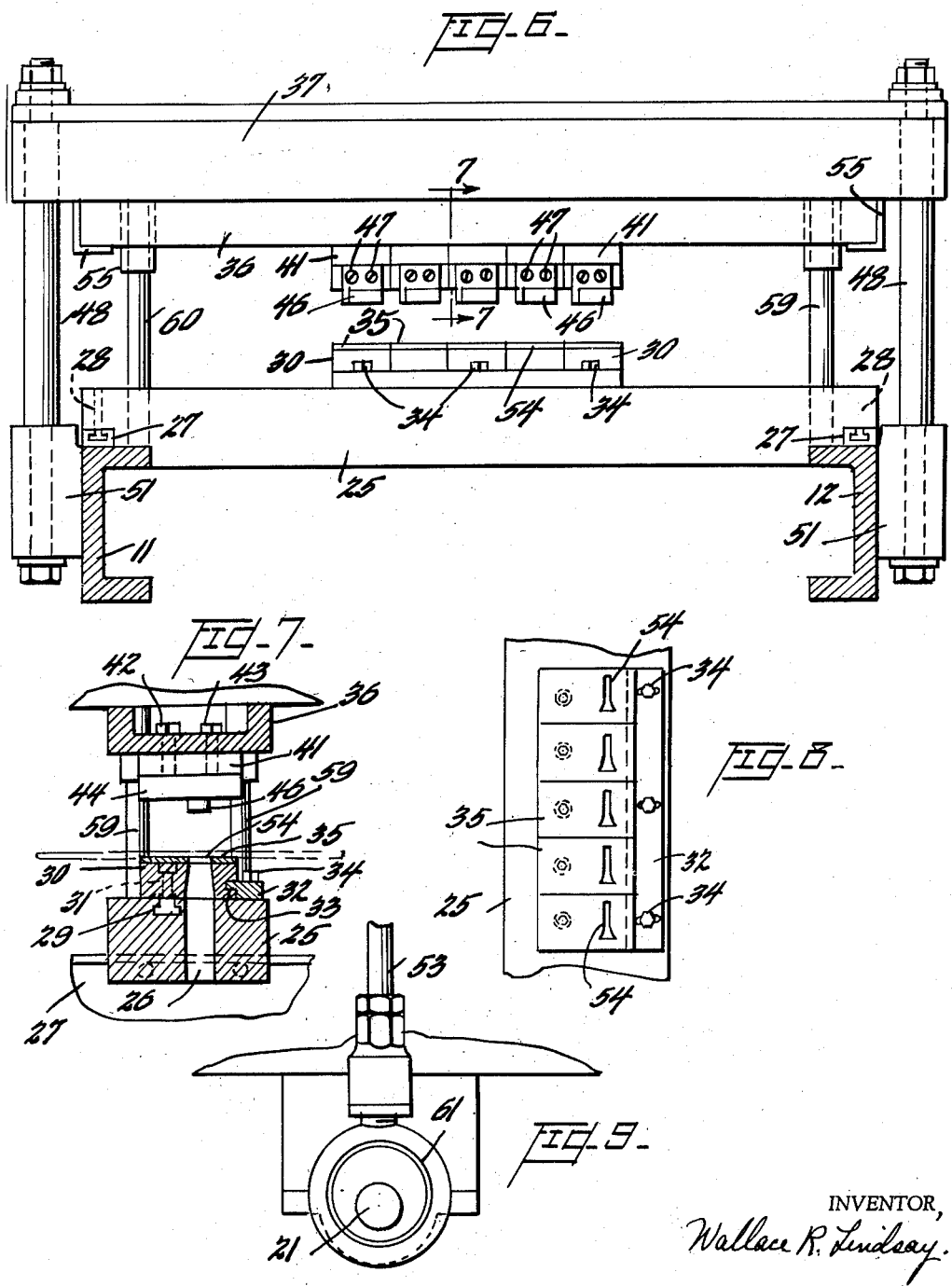

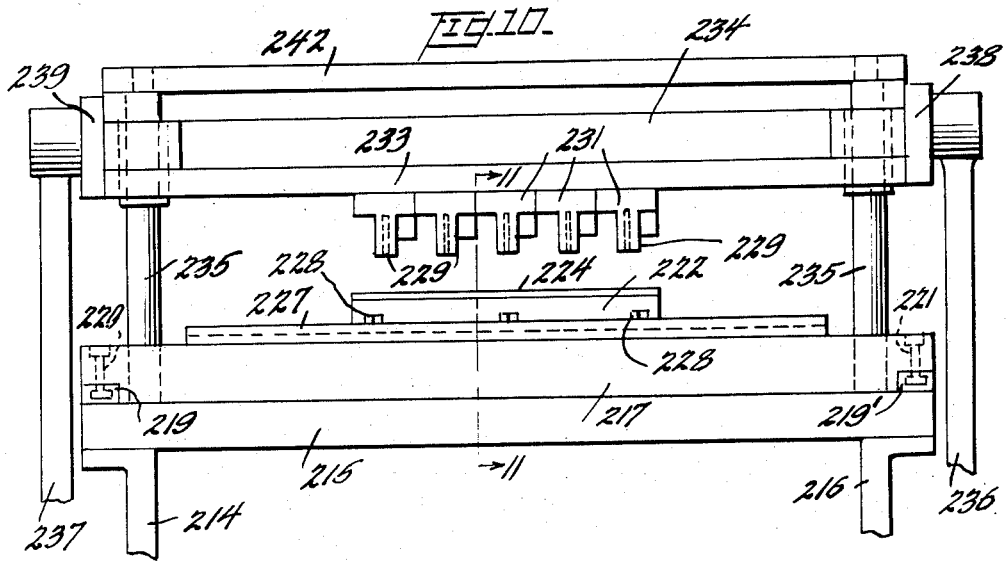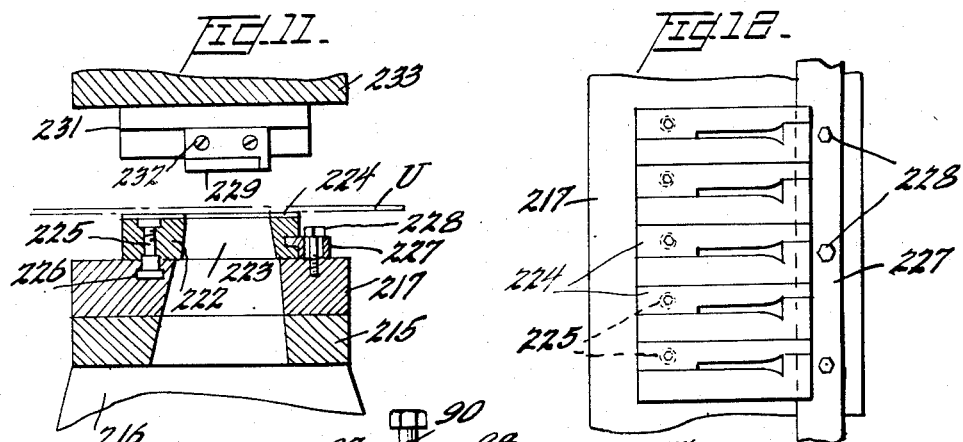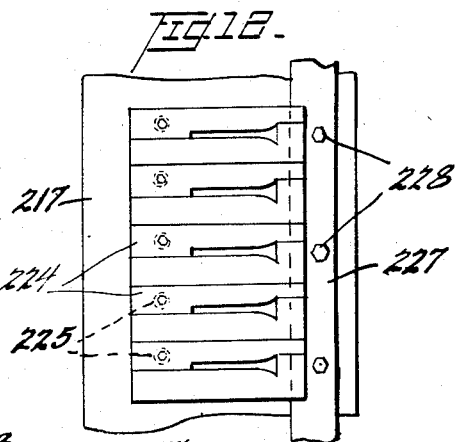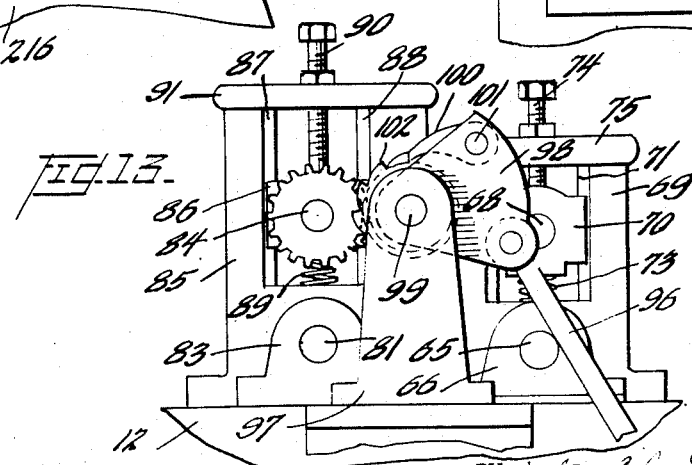

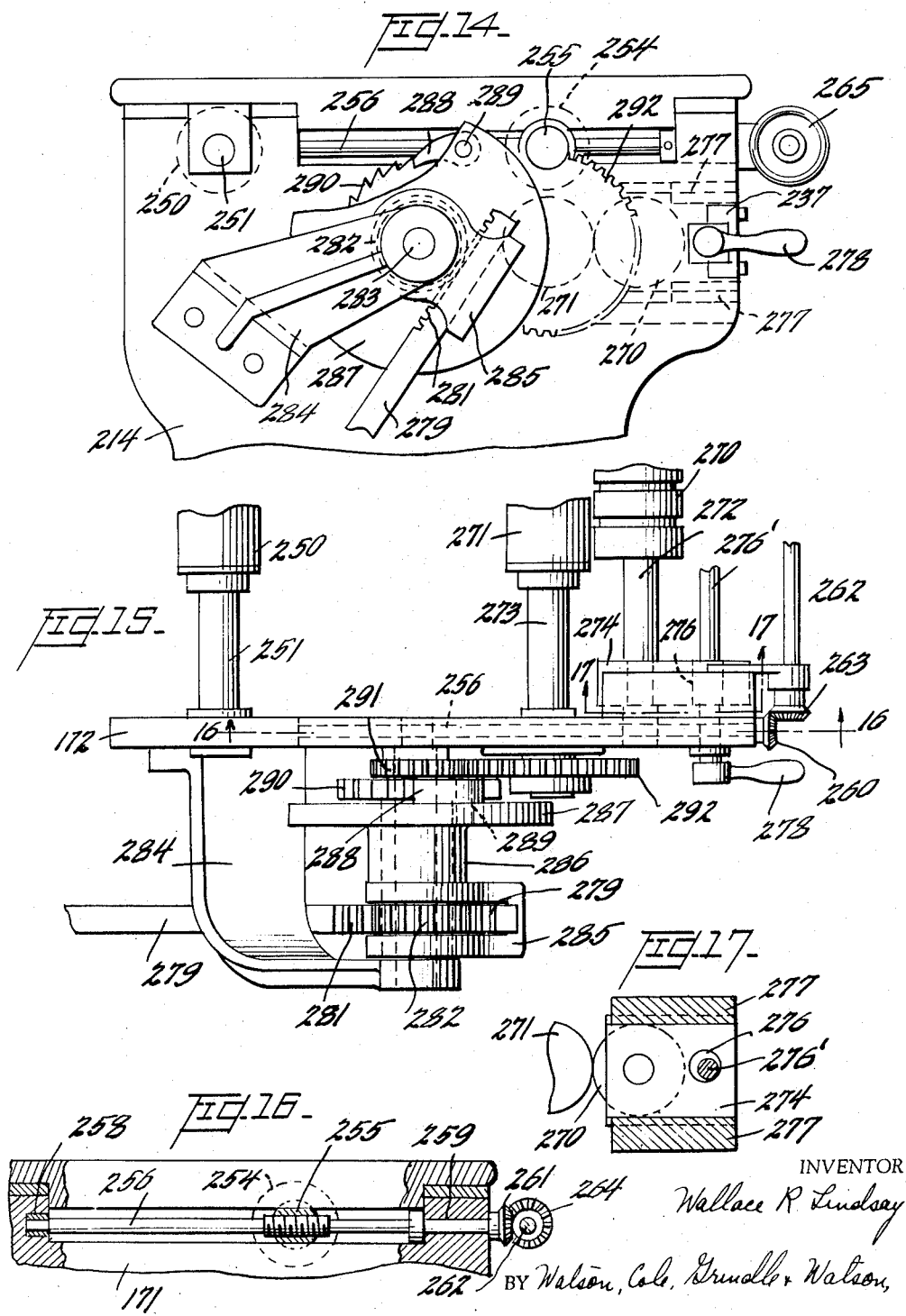

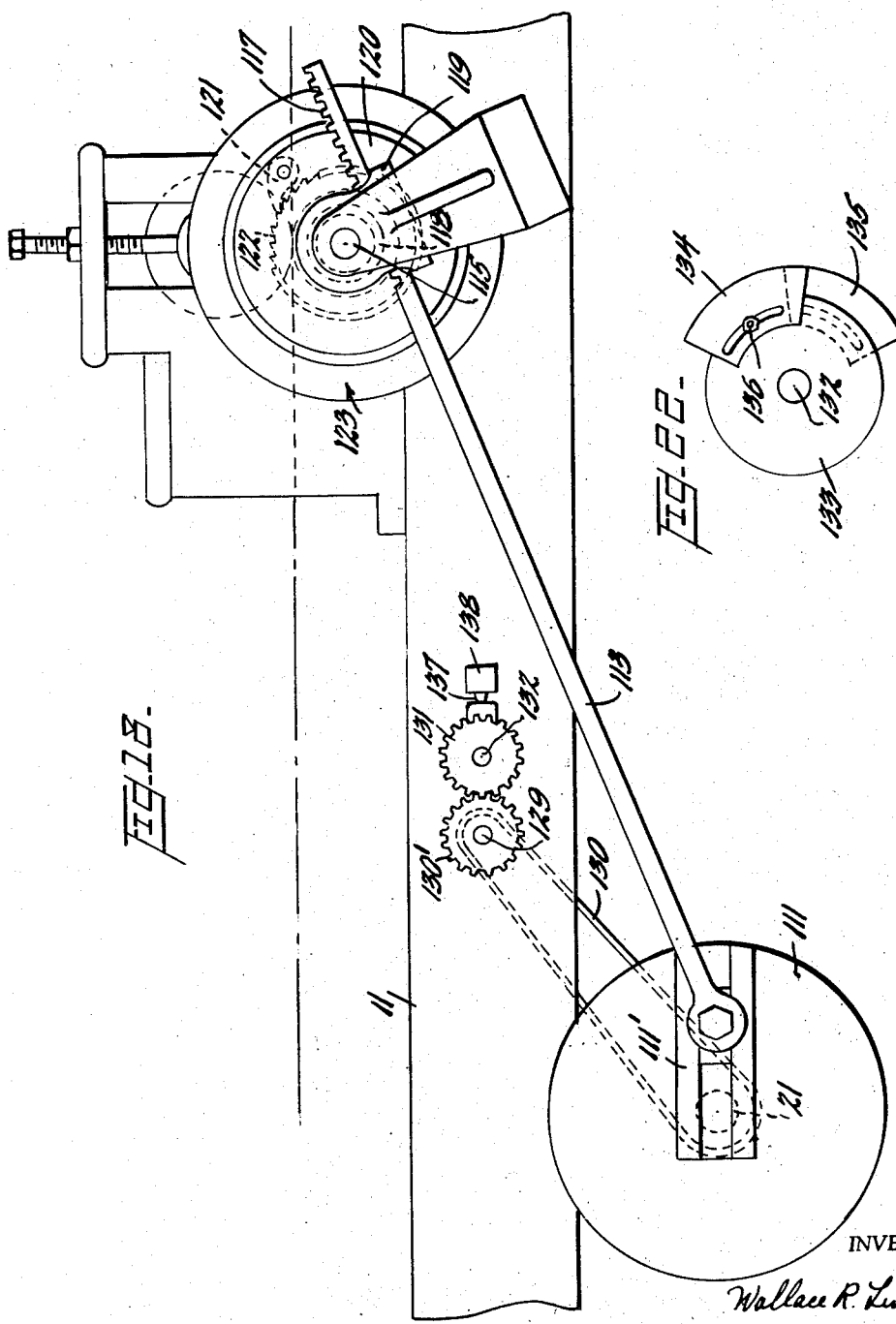

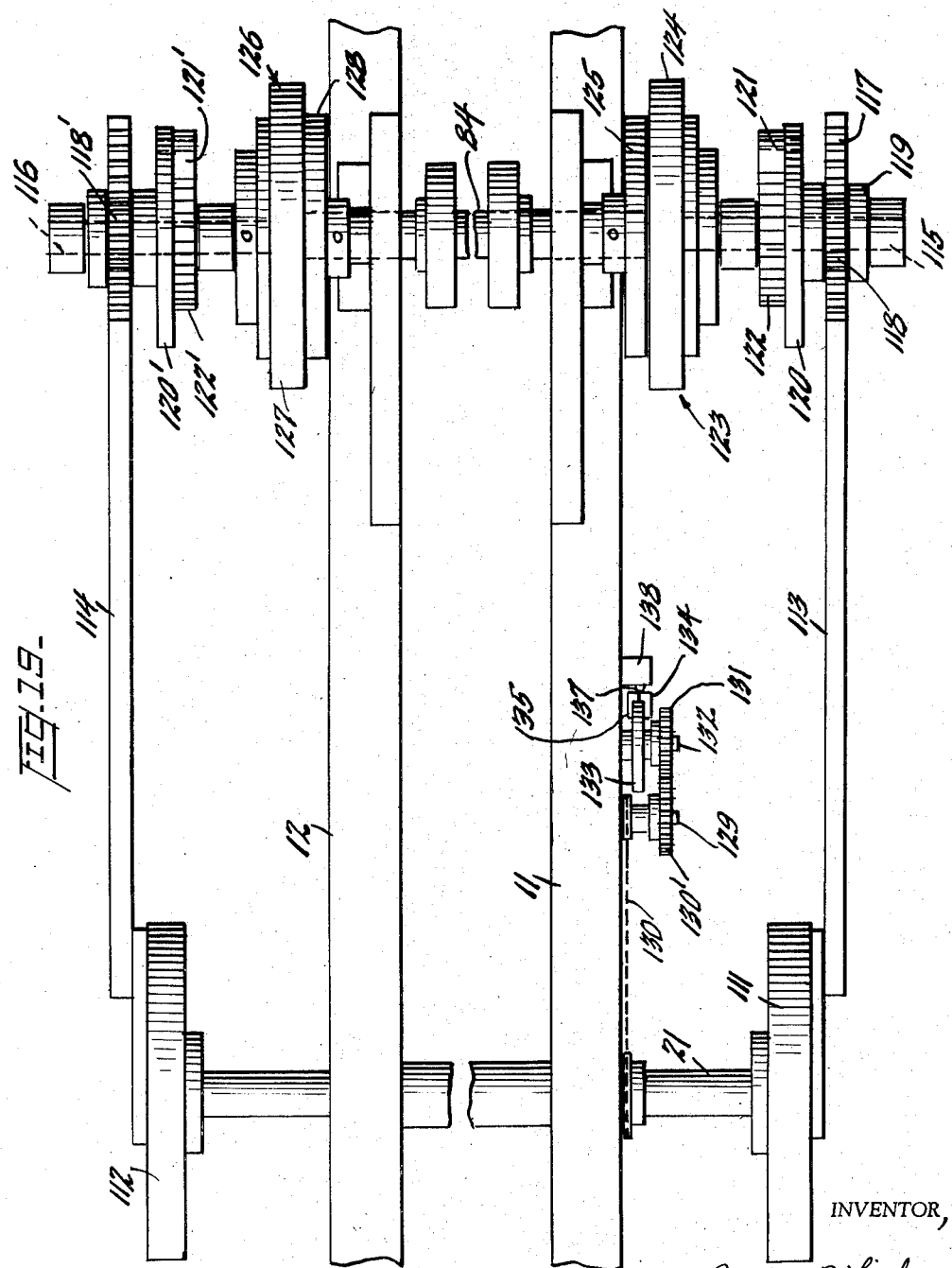

United States Patent Office 2,802,406
Patented Aug. 13, 1957

2,802,406

AUTOMATIC ADJUSTABLE PARTITION MACHINE

Wallace R. Lindsay, Amsterdam, N. Y.

Application October 6, 1954, Serial No. 460,576

14 Claims. (Cl. 93—37)

The present invention relates to automatic die partition machines and more particularly to a machine for automatically processing webs of paperboard or like material to form partitioned fillers for boxes.

Machines of this general type are well known wherein two relatively wide webs of paperboard or like material are advanced independently of each other through a series of processing mechanisms and emerge in the form of completed partitions. One of the webs is generally fed in a plane below the other through a suitable punching mechanism and between a plurality of slitter disks where the web is cut into a plurality of strips. The strips are turned to a vertical position forward of the slitter mechanism and fed in a step-by-step manner in spaced relation through an assembly zone. The upper web, on the other hand, is fed through a suitable punching mechanism and then downwardly in a stepwise manner toward the assembly zone with the slots of the upper web being brought into locking engagement with the slots of the lower strips. A cut-off mechanism severs the upper web at each interval after a stepped feeding, while a second cut-off mechanism severs the lower strips after a predetermined number of stepwise feedings, to thereby form the finished partition. Attempts have been made previously to produce machines of this type in which the above-mentioned processing mechanisms could be adjusted to produce various size partitions, however, for the most part, these machines have not proven entirely satisfactory either from a standpoint of operating efficiency or from the standpoint of lack of complete adjustability for all size partitions. It is therefore a primary object of the present invention to provide an automatic die partition machine which not only can be operated with the highest degree of efficiency but which also is fully adjustable to produce partitions of any size.

One of the specific objects of the invention is to provide a novel, improved, and easily adjustable drive means for the lower web to thereby provide partitions with varying lengthwise cell sizes as well as varying cushion lengths.

Another object of the invention is to provide a cut-off mechanism for the lower web which can be adjusted vertically as well as transversely and longitudinally of the machine to accommodate the making of partitions with varying transverse cell sizes, and to vary the cut-off position with respect to the tuck point to provide small size longitudinal cells and various cushion type partitions.

A further object of the invention is to provide a novel mounting arrangement for the hi-speed roll assemblies whereby they can be adjusted relative to each other to produce partitions having infinitely narrow cells.

Another object of the invention is to provide an improved and more durable mounting for the punches and dies of the web punching assemblies whereby they can be readily adjusted both longitudinally and transversely of the machine.

Another object of the invention is to provide means for fine adjustment of the upper web while the machine is running to accurately bring the slots of the upper web into registry with the slots of the lower web strips at the tucking point.

Other objects and advantages will be apparent from the following more detailed description of the invention when read in conjunction with the accompanying drawings in which:

Figure 1 is a side elevational view of an adjustable die partition machine produced according to the present invention;

Figure 2 is a plan view of the machine;

Figure 3 is an end elevation as viewed from right to left in Figures 1 and 2;

Figure 4 is a longitudinal sectional view taken on the plane of line 4—4 of Figure 2;

Figure 5 is a transverse sectional view taken on the plane of line 5—5 of Figure 4;

Figure 6 is an elevational view of the upper web punching mechanism as viewed from right to left in Figure 1;

Figure 7 is a vertical sectional view taken along the plane of line 7—7 of Figure 6;

Figure 8 is a plan view of the lower die mechanism;

Figure 9 is a view in elevation showing the eccentric mounting for the cranks of the lower web punching mechanism;

Figure 10 is an elevational view of the upper web punching mechanism as viewed from right to left in Figure 1;

Figure 11 is a vertical sectional view taken on the plane of line 11—11 of Figure 10;

Figure 12 is a plan view of the upper die mechanism;

Figure 13 is a side elevational view of part of the lower feed and slitter mechanism as viewed from the opposite side of the machine from Figure 1;

Figure 14 is a side elevational view of the upper feed mechanism;

Figure 15 is a plan view of the same;

Figure 16 is a horizontal sectional view taken on the plane of line 16—16 of Figure 15 showing the timing roll adjustment;

Figure 17 is a similar view taken on the plane of line 17—17 of Figure 15;

Figure 18 is an elevational view of the alternative drive mechanism for the lower feed rolls;

Figure 19 is a plan view of the same;

Figure 20 is a perspective view of the strips of the lower web and the upper web immediately preceding the tuck point;

Figure 21 is a perspective view of a finished partition; and

Figure 22 is a view in elevation showing the adjustable cam mechanism of the lower feed alternate drive.

Referring now more specifically to the drawings, the lower strip or web of paperboard, designated generally by the reference letter L, is fed from a conventional supply such as an unwinding reel, which is not shown since it forms no part of the present invention. As can be seen particularly in Figures 1 and 2, the lower web is advanced in a horizontal plane through web punching mechanism A and thence through a slitter mechanism B where the web is cut into the desired number of separate strips which are to make up the lengthwise members of the partition. The lower web is intermittently fed through the punching and slitter mechanisms by a feeding mechanism C which includes a plurality of cooperating feed rolls frictionally gripping therebetween the strips of the lower web. The strips are turned from the horizontal to a vertical plane immediately forward of the feeding rolls with the lengths of strips, which are fed by the feed rolls, being advanced toward an assembly zone E by means of a high speed roll mechanism designated D. A cutoff mechanism F is provided immediately before the assembly zone and is periodically actuated to sever the strips of the lower web after a predetermined length *l* of the strips (see Fig. 20) is advanced through the assembly zone.

In the meantime, the upper web, which is designated generally by the reference letter U, is intermittently fed from an unwinder roll, not shown, in a horizontal plane through a web punching mechanism G and forwardly over a timing mechanism H where the direction of travel of the web is changed from the horizontal to the vertical. A feeding mechanism J is positioned immediately below the timing mechanism and the web is advanced downwardly from the feeding mechanism toward the assembly zone E with a cutoff mechanism K operating in timed relation with the intermittent feed of the web to sever the web, after a predetermined length *u* of the web, corresponding to the depth of the partition, (Fig. 21) has been tucked into the slots of the strips of the lower web. The finished partition is carried away from the machine by any suitable means such as a belt conveyor M.

The main frame of the machine, designated generally by the reference numeral 10, comprises a generally rectangular bed including a pair of side channel members 11 and 12 (Fig. 2) preferably made of heavy steel, and a pair of end channel members 13 and 14 extending transversely of the machine and interconnecting the channel members 11 and 12. The bed 10 is supported a suitable distance from the floor by means of pairs of depending legs 15 and 16 (Fig. 1) secured adjacent the ends of the bed with one or more, as may be expedient, pairs of supporting legs 17 secured intermediate the ends of the bed. The drive for the various mechanisms of the machine is taken from a main drive shaft 18 which is journaled in suitable brackets 19 secured to the bed 10 of the machine, with the drive shaft 18 being driven by any suitable motor means not shown. Drive is translated from the main drive shaft 18 to a pair of drive shafts 20 and 21, which actuate the lower web punching mechanism, through a gear 22 carried by shaft 18 and meshing gears 23 and 24 carried by shafts 20 and 21 (Fig. 2).

*Lower web punching mechanism*

The lower portion or the female portion of the lower web punching mechanism A, as shown in detail in Figs. 7–9, includes a supporting block 25 extending transversely of the machine and carried on the side frame members 11 and 12. The supporting block is cored at 26 (Fig. 7) and is mounted for longitudinal adjustment on a pair of gibs 27, secured one on the upper surface of each channel member 11 and 12. Set screws 28 extend through the gibs and bear against the supporting block to secure it in the desired position. A T-slot 29 extends the length of the supporting block 25 adjacent the upper edge thereof, with individual die blocks 30 being adjustably mounted on the block 25 and secured thereto by bolts 31 extending through the die blocks into the T-slot 29. The individual die blocks 30 also have a groove extending through their transverse length, with an elongated locking clamp 32 having an extension 33 extending into the grooves of the die blocks and being clamped to the die block 25 by means of bolts 34.

The individual die blocks can be adjusted transversely across the machine by merely loosening the bolts 31 and 34 and sliding the die blocks along the supporting block 25. The dies 35 are secured to the die blocks by any conventional means and have slots 54 extending therethrough to register with the cored portion 26 of the supporting block 25. The dies can be positioned along the supporting block 25 in abutting relation, or, as the case may be, spaced apart to position them to effect the proper spacings between the slots of the lower web.

The upper or male portion of the web punching mechanism includes a generally U-shaped die cap 36 extending transversely of the machine and mounted beneath a generally rectangular pull-down cap 37. Die cap 36 is secured to the underside of the pull-down cap by means of a pair of elongated L-shaped brackets 55 (Fig. 6) which are secured to the pull-down cap in clamping relation by any suitable means. A pair of telescoping rod members 59 and 60 are secured between the lower die block 25 and the upper die cap 36 with the result that the lower and upper portions of the lower punch and die mechanism A are longitudinally adjustable as a unit. Die cap 36 has a pair of spaced parallel slots 39 and 40 (Fig. 4) extending transversely thereof with the individual punch caps 41 being secured to the die cap for adjustability transversely of the machine by means of bolts 42 and 43 extending through slots 39 and 40 respectively. The individual punch blocks 44 are secured to the punch caps 41 by any suitable means such as bolts 45, while the punches 46 are in turn secured by means of bolts or the like 47 to the punch blocks.

Pairs of spaced vertical guide rods 48 and 49 are provided on both sides of the machine and secured at their lower ends to the side channel members 11 and 12 by means of suitable brackets 50 and 51, while pairs of apertured lugs 52 and 52' are secured adjacent the corners of the pull-down cap 37 enveloping the rods 48 and 49 respectively. Vertical reciprocating movement is imparted to the pull-down cap by means of pairs of vertical cranks 53 and 540 one of each pair positioned on either side of the machine and having their upper ends secured to the pull-down cap and their lower ends secured to disks 61 and 62 which are eccentrically mounted adjacent the ends of shafts 20 and 21 respectively, (Fig. 9). As previously mentioned, shafts 20 and 21 are rotated in synchronism and it can be seen therefore that the pull-down cap 37 will be vertically reciprocated along the pairs of guiding rods 48 and 49 to thereby move the punches into and out of female die members to thereby produce the desired slots in the lower web as will be more fully described hereinafter.

*Lower slitter mechanism*

After the lower web has been suitably slotted, it advances from the web punching mechanism A through the slitter mechanism B which includes a plurality of pairs of cooperating rotary slitter disks 64 and 67 mounted one above the other with the lower web passing therebetween (Fig. 4). The lower disks 64 are mounted on a shaft 65 which is suitably journaled adjacent its ends in brackets 66 carried by the respective side channel members 11 and 12. The upper disks 67, on the other hand, are mounted on a shaft 68 which is suitably journaled adjacent its ends in bearings 70 (Fig. 13) mounted for vertical movement between a pair of spaced bearing guides 71 and 72 carried by brackets 69 which are secured to the side channel members 11 and 12. Bearing 70 is normally urged upwardly by means of a spring 73 which bears against the lower edge of bearing 70 and brackets 69, with an adjusting screw 74 threaded through the upper portion 75 of the bracket having its lower end abutting the top of bearing 70 adapted to move the bearings and shaft 68 downwardly against the pressure of springs 73, to thereby position the upper cutter disks relative to the lower disk and thus compensate for the different web thicknesses which may be fed. As can be seen in Figure 2, the individual slitter blades 64 and 67 are adjustably mounted transversely of the machine on their respective shafts 65 and 68 by any suitable means such as set screws 76 with the result that the lower web can be slit into various width strips depending upon the desired depth of the partition (see Fig. 20).

*Lower feed mechanism*

The lower feed mechanism C includes a plurality of upper and lower cooperating feed rolls, the lower feed rolls 80 being mounted on a shaft 81 which is journaled in suitable brackets 82 carried by each of the side channel members 11 and 12, while the upper feed rolls 83 are mounted on a shaft 84 which is vertically adjustable in a manner similar to the upper slitter shaft. The ends of shaft 84 are journaled in bearings 86 which are freely mounted in mutually facing grooves in a pair of vertically spaced bearing guides 87 and 88 carried by the brackets 85 which are supported on the side frame members 11 and 12. Shaft 84 is normally urged in an upward direction by means of springs 89 lying between the lower edges of bearings 86 and brackets 85, while an adjusting screw 90 is threadedly mounted through the top plate 91 of the bracket into bearing relation with the top of the vertically adjustable bearing 86. It is readily seen therefore, that the upper feed rolls can be adjusted relative to the lower feed rolls by merely adjusting screw 90 to thereby accommodate various thicknesses of paper which it may be desired to use. As in the case of the slitter rolls, the individual feed rolls 80 and 83 are also adjustable transversely of the machine on their respective shafts 81 and 84, corresponding to the width of the strips, by any suitable means such as screws (not shown) securing the hubs of the rolls to the shafts.

Drive for lower feed and slitter mechanisms

The feed rolls are driven by means of a pawl and ratchet arrangement which is operatively associated with the driven shaft 21. A crank 96 has one end pivoted adjacent the periphery of a disk 95 mounted on shaft 21, with its other end pivotally secured to arcuate plates 98 which is in turn freely mounted on a stub shaft 99 carried in bearings 97 (Figs. 2 and 13). A pawl 100 is pivotally secured at 101 to the plates 98 and is adapted to engage the teeth of a ratchet 102 which is secured to shaft 99. The rotational movement of shaft 21 thereby causes crank 96 to impart an oscillating motion to plate 98 to thereby intermittently drive ratchet 102 and shaft 99. In the usual case, where there is no cushion at the cut-off point, the teeth of the ratchet are spaced so that every fourth or fifth feed, depending upon the number of transverse cross pieces which are to be used, a double length of web is fed. This double feed is necessary since, at the cut-off point there is no transverse cross piece needed.

The intermittent drive of shaft 99 is transmitted to shaft 84 of the upper feed rolls through a gear 103 mounted on shaft 99 in meshing engagement with a gear 104 mounted adjacent one end of the shaft 84 (Fig. 2). A gear 105 is secured adjacent one end of shaft 81 of the lower feed rolls in meshing engagement with a second gear 106, secured adjacent to the other end of shaft 84, to thereby rotate the lower feed rolls in synchronism with but in an opposite direction from the upper feed rolls. Gear 106 also meshes with an idler gear 107 which in turn meshes with a gear 108 mounted adjacent one end of shaft 68 of the upper slitter blades, to thereby impart intermittent rotary motion to the upper slitter blade in phase with the rotation of the upper feed rolls, while a gear 109 secured adjacent the end of the shaft 65 of the lower slitter blades meshes with gear 108 to thereby drive the lower slitter blades in synchronism with the upper slitter blades and the feed rolls.

The length of feed of the lower web is variable according to the desired longitudinal length L*l* (see Figs. 20 and 21) of the cells of the partition. To effect this desired feed length, gears 103 and 104 are readily interchangeable with different size gears being provided for the different longitudinal lengths of the partition which it is desired to make. Likewise, many times it is desirable to make the free end *le* (Fig. 21) of the partition either shorter or longer than the standard partition length to thereby form a cushion. To allow for this change in cushion size it is necessary, with the above described feed mechanism, to substitute different ratchets 102 to thereby vary the number and spacing of the ratchet teeth.

Alternative lower feed drive

In an alternative drive for the feed rolls, as shown in Figures 18, 19 and 22, a pair of disks 111 and 112 are secured adjacent the ends of driven shaft 21 while a pair of feed racks 113 and 114 each have one end adjustably secured to a guide 111' carried eccentrically on these disks. The free ends of the feed racks 113 and 114 lie adjacent shafts 115 and 116 respectively, which are suitably carried by the frame of the machine and are positioned outside of but in alignment with shaft 84 of the upper feed rolls. As these feed racks drive their respective shafts in a similar manner, the details of only one of these driving mechanisms will be described with similar reference numerals being applied to the other mechanism with the addition of a prime. Feed rack 113 has a series of small teeth 117 adjacent its free end with these teeth being held in engagement with a gear 118 mounted freely on shaft 115 by means of a rack guard 119, which is also freely mounted on shaft 115. Gear 118 is in turn secured to a ratchet plate 120 which carries a dog 121 pivoted adjacent one edge thereof adapted to engage the teeth of a ratchet 122 which is secured to shaft 115. It can be seen, therefore, that the rotary motion of shaft 21 is translated through the pawl and ratchet arrangement described above into intermittent rotary movement of shaft 115. An electric clutch 123 of a conventional type, having a movable plate 124 in driving engagement with shaft 115 and a second plate 125 secured adjacent the end of shaft 84, is energized in a manner described below to thus impart the intermittent rotation of shaft 115 to shaft 84.

In a similar manner feed rack 114 oscillates ratchet plate 120' through gear 118' to thus intermittently drive shaft 116 by means of the pawl and ratchet 121' and 122'. A second clutch 126 having a movable clutch plate 127 carried by shaft 116 and adapted to be moved into driving engagement with a stationary clutch plate 128 which is secured to shaft 84, can be selectively energized to thereby transmit the intermittent rotational movement of shaft 116 to shaft 84. Although the number of teeth and spacings of the teeth on the ratchets 122 and 122' are the same, it will be seen that the feed rolls can be rotated to feed various lengths of web corresponding to the length of the ratchet feed as determined by adjusting the feed crank along guide 111' and by selectively energizing clutches 123 and 126.

The mechanism for selectively energizing the clutches includes a stub shaft 129 suitably journaled in the side channel member 11 and driven by any suitable means such as a belt and pulley arrangement 130 from the shaft 21. A gear 130' is mounted adjacent the end of shaft 129 in meshing engagement with a gear 131 secured adjacent the end of a second shaft 132 which is also suitably journaled in the side channel member 11. A disk 133 is mounted on shaft 132 with a cam including a pair of cam plates 134 and 135 (Fig. 22) protruding from the periphery and adjustably secured thereto by suitable means such as a pin and slot arrangement 136. A switch 137 mounted on a bracket 138 carried by the channel member 11 and lying in the path of the cam plates 134 and 135 is of a conventional type, wherein, when it is in its fully extended position (to the left as viewed in Figs. 18 and 19) clutch 126 is energized to thereby drivingly connect shaft 116 to shaft 84 and thus transmit the intermittent drive of the ratchet and pawl arrangement 121', 122' thereto.

When it is desired to vary the length of the feed, as for example to vary the length *le* (Fig. 20) of the end of the partition to provide a cushion, or in the usual case to feed a double length at the cut-off point, cam 134 or 135 are adjusted to engage switch 137 on each revolution of the disk and move it toward the right, as viewed in Figs. 18 and 19, to thus break the circuit to clutch 126 and at the same time energize clutch 123 to thereby drivingly connect shaft 115 to shaft 84 to impart the intermittent feed of pawl and ratchet 121 and 122 to the feed rolls. As the disk 133 continues to rotate moving cam 134 out of engagement with switch 137, switch 137 is spring biased toward its fully extended position to thereby again energize clutch 126 and deenergize clutch 123. It is apparent therefore that by interchanging ratchets 122 and 122', adjusting the cam plates 134 and 135, and adjusting the effective feed lengths of racks 113 and 114, any desired sequence of long and short feeds of the lower web can be effected.

High speed roll assembly

After the lower web has been slit into strips and fed forwardly by means of the feed rolls, the travel of the strips is changed from the horizontal plane to a vertical plane with the lengths of strips as metered by the feed rolls being advanced toward the assembly zone by means of the high speed roll assembly D. This assembly includes a plurality of coacting pairs of rolls, with 5 of such pairs being illustrated. Each roll pair is identical in construction and includes two rolls designated by reference numerals 141 and 142, with the ends of these rolls being suitably journaled in blocks 143 and 144. Blocks 143 and 144 are supported in a pair of cut-out channels in head supporting blocks 145 and 146, and as can be seen in Figures 4 and 5, the blocks of the successive roll pairs are staggered to allow closer transverse adjustment for bringing the roll pairs toward each other and, in some instances, where the width w of a partition is extremely narrow, to an overlapping position. The head blocks 143 and 144 are adjustably secured in the channel members by any suitable means such as gibs 147.

The high speed rolls are driven from shaft 21 through a second shaft 148 suitably journaled in brackets carried by the side channel members 11 and 12 and drivingly connected to shaft 21 by means of a suitable chain and sprocket arrangement 149 (Fig. 1). A further chain and sprocket assembly 150 drivingly interconnects shaft 148 with a shaft 151, which is also suitably mounted in brackets carried on the inside of channel member 12. A bevel gear 152 (Fig. 5) carried on the free end of shaft 151 meshes with a gear 153 carried by a drive shaft 154 for the high speed rolls, with the individual rolls being driven from shaft 154 through a suitable belt and pulley arrangement. As seen in Fig. 5, a belt 155 over-runs a pulley 156 on shaft 154 and also over-runs a pulley secured to one of the shafts of the rolls 141 or 142 of each roll pair in such a manner that the upper rolls, as viewed in Figure 5, are rotated in a counter-clockwise direction with the lower rolls being rotated in a clockwise direction. A suitable idler roll 157 is adjustably carried on an arm 158 secured to a bracket 159 which depends from the side channel member 12 to maintain the belt taut. It can be seen therefore, that with the adjustable pairs of high speed feed rolls, any spacing between the strips of the lower web can be accommodated, with the rolls feeding the lengths of strips which have been fed by the lower feed roll assembly C.

Lower cut-off assembly

The strips of the lower web are advanced by the high speed feed rolls into the assembly zone E with the lower cut-off mechanism F being positioned immediately before the assembly zone. The cut-off assembly includes a backing plate 165 which is centrally cored out at 166 (Fig. 5) to allow the strips of the lower web to pass through. The supporting block is mounted adjacent its ends for vertical adjustment in the channeled supporting blocks 167 and 168 which are in turn mounted for adjustment longitudinally of the machine on gibs 169 and 170 carried by the upstanding side frame members 171 and 172. The mechanism illustrated herein for adjusting the cut-off longitudinally of the machine includes a pair of longitudinally extending threaded studs 325 and 326 having one end threaded into the supporting blocks 167 and 168 respectively. The free ends of the studs are threaded through lugs 327 and 328 respectively carried by the side frame members 171 and 172 (Fig. 3) and have miter gears 329 and 330 secured to the free ends thereof. A transversely extending shaft 331 is journaled between the side frames 171 and 172 and carries a pair of miter gears 332 and 333 in meshing engagement with gears 329 and 330 respectively. A suitable handle 334 is secured to one end of shaft 331 which extends beyond the frame of the machine and it is apparent that the cut-off mechanism can be adjusted longitudinally of the machine by merely turning the handle 334.

A plurality of blade blocks 173 extend transversely of the machine throughout the width of core 166 with the end blocks abutting the backing plate 165. The blocks have vertical slots 174 adjacent one edge thereof to permit passage of the strips of the lower webs, with the blocks either lying in abutting relation to each other or held apart by spacers 266 lying therebetween. The blocks as a unit are adjustably supported transversely of the machine by means of pairs of rods 194, 195, and 196, 197 in a manner described hereinafter. A stationary blade 267 is secured adjacent the slots in each of the supporting blocks 173 while a plurality of movable blades 175 are also positioned adjacent the slots and pivotally mounted intermediate their ends by means of studs 176 extending into the stationary blade supporting structure. The movable blades 175 are also pivotally secured adjacent their lower ends at 177 to an elongated floating bar 178 (Fig. 3). Bar 178 is normally biased toward the left as viewed in Fig. 3 by any suitable means such as a spring 208.

The mechanism for actuating the movable blades 175 includes a shaft 209 (Fig. 4) journaled in brackets depending from the main frame of the machine with a miter gear 179 adjacent one end thereof meshing with a gear 180 carried intermediate the ends of driven shaft 148. A gear 181 secured adjacent the other end of shaft 209 meshes with a gear 182 secured adjacent the end of a second shaft 183 which is also suitably journaled in brackets depending from the main frame. A disk 187 is mounted adjacent the free end of shaft 183 with a cam 188 adjustably mounted on the periphery of the disk adapted, upon rotation of the disk, to engage a roller 189 mounted adjacent the end of an arm 190. Arm 190 is pivotally mounted and longitudinally adjustable on a pin 192 carried between brackets 193 and 193' which are secured between the side channel members 11 and 12 of the main frame, with the upper end of the arm being pivotally secured to the floating drive bar 178 by a suitable pin and slot connection 191. It can be seen therefore that as the disk 187 rotates, cam 188 will periodically engage roller 189 to thereby swing the driving bar 178 to the right as viewed in Fig. 3, and thus move the cutter blades 175 into cutting engagement with the stationary cutter blades 267 to thereby sever the strips of the lower web which have been advanced through the slots 174.

It can be readily seen that with only one cam 188 mounted on disk 187, the lower cut-off mechanism will be actuated once for each revolution of the disk. As for example, when making the partition illustrated in Fig. 21, it is necessary for the disk to rotate one complete revolution for every five feed lengths of the web and in order to vary the lengths and/or number of longitudinal partitions, the speed of rotation of disk 187 must be varied. To effect this change in speed, gears 181 and 182, which are mounted on shafts 183 and 209, are readily interchangeable to thereby provide gears of various sizes and thus increase or decrease the rotational speed of the disk.

The cut-off mechanism is mounted for adjustment transversely of the machine to accommodate different width cells w (Fig. 21) of the partition by means of the pairs of rods 194, 195 and 196, 197 positioned on either side of the stationary blade blocks 173 and having one of their ends bearing against the outside blade blocks and their other ends threadedly secured in blocks 167 and 168. Lock nuts 198 are threaded on the rods for locking engagement with the blocks and it can be seen therefore that the rods can be adjusted transversely to thereby adjust the stationary blades as a unit in either direction across the machine.

The mechanism for vertically adjusting the lower cut-off mechanism includes a pair of vertically extending studs 335 and 336 (Fig. 3) positioned adjacent each side of the machine and having their lower ends threaded into the supporting base 165. The studs are also threaded through a pair of lugs 337 and 338 carried by the respective side frame members 171 and 172 with a pair of miter gears 339 and 340 being geared to the upper ends thereof. A transversely extending shaft 341 is journaled between the side frames 171 and 172 with a pair of miter gears 342 and 343 secured thereto in meshing engagement with gears 339 and 340. A suitable wheel type handle 344 is secured to one end of shaft 341 which extends to one side of the frame, and it is apparent that the cut-off mechanism can be adjusted vertically, for purposes set forth fully in the hereinafter described operation of the overall operation of the adjustable features of the machine, by merely turning handle 344 to rotate shaft 341 in the desired direction.

While the lower web is being processed through the machine and advanced toward the assembly zone, the upper web U is simultaneously being processed through the machine at a level above the lower web and advanced toward the assembly zone. The upper web is fed from a suitable unwinding roll (not shown) in a similar manner to the lower web with a friction drag which maintains the upper web taut being positioned adjacent the upper punch and die mechanism G. The friction drag includes a lower plate 210 (Fig. 1) mounted on a bracket 211 carried by an upstanding supporting frame 214, and an upper plate 212 lying above and adjustable relative to the lower plate by means of a pair of suitable clamping screws 213 extending between the plates in such a manner that the upper plate can be moved relative to the lower plate to thereby adjust the frictional grip on the web. After leaving the friction drag, the web advances toward the upper web punching mechanism which is constructed along the lines of the lower punching mechanism with all the adjustable features thereof.

*Upper web punching mechanism*

The upper web punching mechanism, shown in detail in Figs. 10-12, is supported on a generally rectangular supporting plate 215 secured between the upstanding side frame members 214 and 216 which are carried by the side channel members 11 and 12. A die base 217 being cored at its central portion at 218 is supported on plate 215 by means of a pair of gibs 219 and 219', (Fig. 10) one being secured on either side of the frame, with T-bolts 220 and 221 extending through the die block 217 into T-slots in the gibs 219 and 219'. Die blocks 222, to which the female dies 224 are secured, are cored at 223 and mounted on the die base 217 for transverse adjustment by means of T-bolts 225 extending through transversely extending slots in the die blocks and into a T-groove 226 extending transversely of the die base. The die blocks also have a groove extending transversely thereof adjacent their lower edges with a suitable elongated L-shaped clamping member 227 adapted to engage these grooves and be secured to the die base by means of bolts 228 which extend through the clamp into the die base. It is apparent therefore, that with the T-slots running longitudinally of the gibs 218 and 219 and the T-slot extending transversely of the die base 217, the female dies 224 can be adjusted either transversely or longitudinally of the machine to thereby selectively position the slots of the upper web.

The upper or male portion of the punching mechanism includes a plurality of individual punches 229 which are adapted to move into and out of the female dies with the punches being secured to punch blocks 231 by suitable means such as screws 232. The punch blocks are in turn secured to an elongated punch cap 233 which is adjustably secured to a die cap 234 by means of elongated transverse slots extending through the die cap with suitable screws 235 extending through the slots into the punch cap. The punch mechanism is guided in its movement toward the lower die mechanism by means of posts 235 positioned one at each corner of the rectangular die mechanism and mounted in die base 217, with the upper die cap having suitable openings therein to allow the posts to pass freely therethrough. The posts 235 are held rigid at their upper ends by means of braces 242 secured between the posts. The punches are moved relative to the lower dies by means of a pair of crank arms 236 and 237 which have their upper ends secured to die cap 234 at 238 and 239 with their lower ends being secured to a pair of disks 240 and 241 eccentrically mounted adjacent the ends of the driven shaft 148. It can be seen therefore, that as shaft 148 is rotated, in a manner previously described, that the cranks 236 and 237 will cause the die cap to be raised and lowered with punches 229 being brought into and out of registry with the openings 230 in dies 224 to thereby affect the desired punching of the upper web.

The upper web continues its movement in a horizontal plane after leaving the upper punching mechanism G and is guided in its forward movement by a transversely extending roll 250 (Figs. 1 and 2) mounted on a shaft 251 which is suitably journaled in the upstanding side frame members 171 and 172 which are mounted on the side channel members 11 and 12. A second guiding roll 254 is mounted directly above the assembly zone E with the web U changing its direction of travel as it leaves roll 254 from the horizontal to the vertical. The roll 254 is longitudinally adjustable to control the timing of the upper web to accurately bring the slots of the upper web into registry with the slots of the lower strips at the tucking point and is freely mounted on a shaft 255 which has a pair of threaded apertures 243 and 244 adjacent the ends thereof with a pair of spaced parallel shafts 256 carried one adjacent either side of the machine by the side frame members 171 and 172 respectively, threaded through said respective apertures. Shafts 256 are journaled adjacent their ends in bearings 258 and 259, and are provided with miter gears 260 and 261 at their outer ends. A generally horizontal shaft 262 is carried adjacent the forward end of the main frame and suitably journaled in the side frame members 171 and 172 with a pair of miter gears 263 and 264 mounted adjacent their ends in meshing engagement with the miter gears 260 and 261 of the shafts 256. A suitable hand wheel 265 is secured adjacent one end of shaft 262 with the result that roll 254 can be moved longitudinally of the machine by merely rotating the hand wheel 265 to thereby adjust the timing of the web U so as to advance it into the assembly zone E at the proper time.

*Upper feed assembly*

The upper web is intermittently fed toward the assembly zone by means of a pair of cooperating feed rolls 270 and 271 lying in a plane below the plane of the axis of the timing roll 254 and mounted on a pair of shafts 272 and 273 (Figs. 2 and 4). Shaft 273 is suitably journaled between the side frame members 171 and 172, while shaft 272 is journaled in blocks 274 slidably mounted in grooves cut in the side plate members 171 and 172 respectively. Roll 270 can thereby be adjusted relative to roll 271 to accommodate different thicknesses of paper by cams 276 positioned in the mounting blocks 274 which are guided by plates 277, carried by the side frames. The cam is secured to a shaft 276' mounted in the side frames and has a handle 278 secured to one end. As the shaft is rotated by the handle the cams will move the blocks 274, carrying roll 270 toward or away from roll 271.

The mechanism for driving the feed rolls includes a crank 279 pivotally and adjustably secured at 281 to a block 280 mounted adjacent the periphery of the disk 240' carried on driven shaft 148. The free end of crank 279 is provided with teeth 281 and held in engagement with a gear 282 mounted on a shaft 283 (Figure 14 and 15) which is suitably journaled between the side frame member 172 and a bracket 254 secured to the side frame member. A suitable cage 285 freely mounted on shaft 283 holds the crank in engagement with gear 282. A disk 287 is secured to a hub 286 which is in turn secured to the gear 282, with a pawl 288 pivotally secured at 289 adjacent the periphery of the disk adapted to engage the teeth of a ratchet 290 which is secured to shaft 283. A pair of meshing gears 291 and 292 mounted on shafts 283 and 273 respectively transmit the rotational movement of shaft 283 to shaft 273, and it is apparent therefore, that as shaft 148 rotates, the rack 279 will be moved upwardly and downwardly to oscillate the disk 287 to thereby intermittently rotate ratchet 290 and thus intermittently rotate feed roll 271 to advance the web downwardly in a stepwise movement. Ratchet 290 is designed and constructed with a large number of short teeth, and it can be seen that the length of feed of the upper web can be varied by adjusting the effective feed length of the crank 279.

Upper cut-off mechanism

As the upper strip of paper is advanced downwardly toward the assembly zone, the notches of the upper strip are brought into register, see Fig. 20, with the notches of the lower strips. The cut-off mechanism for severing the upper web so that the top edge of the cut-off portion lies flush with the top edges of the longitudinal strips *l* is positioned immediately above the assembly zone and includes an elongated stationary cutting blade 300 with an oblique cut-out portion forming a cutting edge 301 mounted on a supporting block 302. A lug or the like 303 is also secured to the supporting base 302 with a pair of upstanding spaced guide rods 304 and 305 having their lower ends secured in the protuberance 303. An elongated bar 306 carries the movable cutting blade 307 and has openings 308 and 309 through which rods 304 and 305 respectively are adapted to extend to thereby guide the cutting blade throughout its movement.

The mechanism for moving blade 307 into and out of engagement with the cutting edge 301 of the stationary blade includes a pair of cranks 310 and 311 pivotally secured at their upper ends adjacent the ends of supporting bar 306, with their lower ends eccentrically secured to disks 312 and 313 mounted adjacent the ends of a shaft 314. Shaft 314 is suitably journaled between the side channel members 11 and 12 and is driven by a chain and sprocket assembly 315 (Fig. 4) from the driven shaft 148. It can be seen, therefore, that the rotation of shaft 312 impacts oscillating motion to cranks 310 and 311 to thereby move blade 307 into and out of cutting engagement with stationary blade 300.

The upper cut-off mechanism is adjustable vertically of the machine by means of a pair of rods 199 and 200 threaded through the supporting block 302 with their lower ends abutting a pair of lugs 201 and 202 which are secured to the side frame members 171 and 172. A pair of bevel gears 203 and 204 are mounted on the free ends of the rod members in meshing engagement with a pair of beveled gears 205 and 206 carried adjacent the end of a transverse shaft 207 which is suitably journaled in the side frame members 171 and 172. A hand wheel 208 is mounted adjacent one end of rod 207, and upon rotation of shaft 207, the cut-off mechanism as a unit can be either raised or lowered depending upon the desired depth *d* (Fig. 20) of the partition. Cranks 310 and 311 are preferably constructed of two members connected by an internally threaded spacer 316 (Fig. 1) to thereby adjust the length of the cranks to compensate for the vertical adjustability of the cut-off.

Operation and adjustability

The adjustable features of the machine will now be described in connection with a partition as shown in Figure 21 having four longitudinal and four cross pieces. The lower web is selected of such a width that the sum of the depths *d* (Fig. 20) of the lower strips of the partition equals the width of the web. The female dies of the lower web punching mechanism A are next adjusted transversely of the machine by loosening the bolts 31 and 34 and positioning the die blocks 30 along the supporting block 25, while the punches 46 are also adjusted transversely of the machine to overlie the female dies by loosening slots 42 and 43 and adjusting the position of the punch caps 41. The punches and dies are positioned so that the wide or upper portion (see Fig. 20) of the slots will lie adjacent the lines of slitting of the lower web.

The slitter disks 64 and 67 are adjusted across the machine on their respective shafts 65 and 68 by loosening set screws 76 to thereby slit the lower web into strips of a width corresponding to the desired depth *d* of the partition. Likewise, the feed rolls 80 and 83 are adjusted transversely of the machine on their respective shafts 81 and 84 by loosening screws 92 so as to grip the strips intermediate their edges.

The longitudinal length *le* of the partition cells is selectively determined by adjusting the lower feed mechanism. In the instance when no cushion is provided at the ends of the partition, a ratchet 102 is used having its teeth arranged to feed a double length of the lower web every fifth feed. The actual length *Ll* of the partition is controlled by selecting the interchangeable gears 103 and 104 to either rotate the feed rolls a greater or smaller number of degrees for each feed of the ratchet. If a cushion is to be provided, a ratchet 102 must be selected in which every fifth tooth is either longer or shorter than double the length of the other teeth.

In using the alternative drive means for the feed rolls as shown in Figs. 18-20, one of the ratchets 122 or 122' is selected having teeth spaced to drive the rolls through a regular feed length, while the other has teeth spaced to provide a feed of the desired length at the cut-off point. It can be seen, therefore, that by adjusting the position of cams 134 and 135 and adjusting the effective feed lengths of feed racks 113 and 114, any lengths *Ll* and *le* of a partition can be provided.

The lengths of the strips of the lower web which are fed by the feed rolls are advanced toward the assembly zone in vertically spaced planes by means of the high speed rolls. The rolls can be adjusted transversely of the machine by sliding the mounting blocks 143 and 144 in the grooves in the head blocks 145 and 146 to thereby vary the transverse width *W* of the cells of the partition. As previously mentioned, the mounting blocks of the adjacent pairs of high speed rolls are staggered to thus accommodate partitions having infinitely narrow transverse cells.

The lower cut-off mechanism is adjustable transversely of the machine as a unit to receive the strips of the lower web as spaced by the high speed rolls by adjusting the pairs of supporting rods 194, 195 and 196, 197. The stationary blades are also adjustable relative to each other by utilizing various size spacers 266 between the blade blocks. When making partitions of various sizes where the longitudinal length of the end or open cell, designated *le* in Fig. 21, is the same as the longitudinal length *Ll* of the other cells, the lower cut-off need not be moved longitudinally of the machine as the lengths can be varied merely by changing the feed lengths. When, however, a cushioned end is to be provided in which the open cell length *le* is of a different length than the other cell lengths *Ll*, the cut-off must be adjusted longitudinally of the machine to compensate for the different length cushions. This adjustment is effected by rotating shaft 331 by means of the handle 334 to slide blocks 169 and 170 of the cut-off longitudinally of the machine on gibs 169 and 170. In those instances where the cell length *le* is minutely small, the lower cut-off must be lowered by rotating shaft 341 to thereby allow the cut-off to be moved longitudinally forward of the machine to a point beneath the upper cut-off to thus cut the web at a point nearer the tuck point.

The upper web U is selected of a width corresponding to the overall transverse width W of the partition (Fig. 20) with the female die blocks 222 of the upper web punching mechanism and the punch blocks being selectively adjusted across the machine to position the slots in the upper web a distance apart corresponding to the width *w* between the strips of the lower web. The feed lengths of the upper web are adjusted by regulating the effective feed length of feed rack 279 to correspond to the desired depth *d* of the partition. As the various drive mechanisms of the machine are in synchronism, the upper web will be fed in timed relation with each feeding of the lower web to thus bring the slots of the upper web into registry with the slots of lower web strips on each successive feed thereof. Roll 254 is readily adjusted by hand wheel 265 to accurately time the downward movement of the upper web to insure that the slots of the upper web easily fall into the slots of the lower web strips.

The upper cut-off is adjustable vertically of the machine to provide partitions of various depths *d* by merely rotating hand wheel 208 to cause rods 199 and 201 to raise or lower the suporting block 302 of the cut-off. The length of cranks 310 and 311 must also be adjusted by rotating spacers 316.

It can be seen from the above description that a machine constructed according to the present invention can be effectively adjusted to make any size partition which may be desired. It should be understood, however, that the adjustable and automatic die partition machine as described and illustrated is by way of example only and any changes which might occur to one skilled in the art are contemplated within the scope of the following claims.

Having thus described the invention, what is claimed as new and desired to be secured by Letters Patent is:

1. An automatic die partition machine, which comprises means for intermittently feeding a first and second web in timed relation through the machine toward an assembly point, means for punching slots in said webs, means for slitting said first web into strips, means for directing said strips and said second web into interlocking engagement with each other and means for selectively severing said strips and said web, said means for feeding said first web including a pair of shafts, at least one pair of rollers mounted on the respective shafts and having their peripheries lying in close proximity to each other, means for driving said shafts including a pair of ratchets freely mounted on one of said shafts, means for driving said ratchets, and means for selectively connecting one of said ratchets with said shaft to thereby drive said feed rolls.

2. An automatic die partition machine as set forth in claim 1 in which said last means includes clutch means operatively connected to said ratchets and means for selectively engaging said clutches.

3. An automatic die partition machine as set forth in claim 2 in which said last means includes an electric source connected to said clutches, a two-way switch positioned between said source and said clutches, and means for selectively and automatically controlling said switch including a cam element driven in synchronism with said ratchet driving means.

4. In an automatic die partition machine, a main frame, means carried by said frame for feeding a first and second web in a generally horizontal plane through said machine in a step-by-step manner, a first and second vertically reciprocating web punching mechanism for cutting slots in said webs, means for slitting said first web into strips, means for turning said strips into a generally vertical plane, means for directing said second web downwardly to bring its slots into tucking engagement with the slots of said strips, means to sever said second web to form cross-pieces for said strips, a cut-off means for severing said strips after a desired number of cross-pieces have been coupled therewith to form a completed partition, said cut-off means including a plurality of stationary blades and a plurality of movable blades, means for periodically moving said movable blades into cutting engagement with said stationary blades, and means to adjust said stationary blades transversely of the machine, said cut-off including a frame, and said last mentioned means including means for adjusting said stationary blades as a unit across the machine, said last means including at least one rod positioned on either side and having one end abutting the outside blades of said unit, with the other end thereof abutting said cutoff frame, and means to adjust said rods relative to said blades.

5. In an automatic die partition machine including web feeding mechanism, the combination with said web feeding mechanism of a pair of intermittent drive means, driving mechanism connected to said drive means for driving the respective means through relatively different degrees of intermittent movement, clutches separately operative to connect each such intermittent drive means to said web feeding mechanism, and means driven from said driving mechanism for actuating said clutches at intervals to disconnect one such drive means from and connect another such drive means to said web feeding mechanism.

6. The combination of claim 5 wherein each such intermittent drive means includes a ratchet wheel associated with its respective clutch for driving connection with said web feeding mechanism, an oscillating member carrying a pawl for imparting intermittent rotation to said wheel, a rotary drive shaft and a pitman operatively eccentrically connecting said drive shaft to said oscillating member.

7. In an automatic die partition machine, intermittent web feeding mechanism comprising a constantly rotating drive shaft, a driven shaft, a pair of intermittent drive means both driven from said drive shaft through relatively different degrees of intermittent movement, electric clutches separately operative to connect each such intermittent drive means to said driven shaft, energizing circuits for the respective clutches, switch means controlling the energizing circuits of the respective clutches and operative to selectively energize either of said clutches, and control means driven from said constantly rotating shaft for periodically actuating said switch means to alternately energize the respective clutches.

8. The combination of claim 7 wherein said control means comprises a cam mounted for rotation in controlling engagement with said switch means.

9. The combination of claim 8 wherein said cam includes switch actuating elements relatively adjustable around the periphery of said cam for varying the relative degrees of intermittent motion of said intermittent drive means.

10. The combination of claim 5 wherein said clutches are electric clutches, each including an energizing circuit, and said means for actuating the clutches comprises switch means controlling the respective circuits, said cam being mounted for rotation in controlling relation with said switch means.

11. The combination of claim 7 wherein each said intermittent drive means comprises a ratchet wheel associated with its respective clutch for driving connection therethrough to said web feeding mechanism, an oscillating member swingable about the axis of said wheel, and a pawl carried by said member for operative engagement with said wheel, and means are provided for oscillating both of said members in unison.

12. In an automatic die partition machine having an intermittently actuated web feeding mechanism, the combination of means for selectively imparting different degrees of intermittent feeding motion to said mechanism comprising a constantly rotating drive shaft, intermittently rotating ratchet drives having driven members separately mounted for oscillation, connecting members eccentrically linking said ratchet drives to the respective driven members to be oscillated responsive to rotation of said driven shaft, and means for selectively connecting any of said driven members in driving relation to the web feeding mechanism.

13. The combination of claim 12 including mechanism driven by said drive shaft for successively connecting different driven members in driving relation to the web feeding mechanism.

14. The combination of claim 13 wherein said mechanism driven by the drive shaft includes ratchet drives, each including an oscillating pawl carrying member, and reciprocating means eccentrically connected to said drive shaft and adjustable toward and away from its rotational axis, said means engaging the pawl carrying member to impart oscillation thereto.

References Cited in the file of this patent
UNITED STATES PATENTS

| | | |
|---|---|---|
| 644,762 | Carmody | Mar. 6, 1900 |
| 1,206,496 | Axcell | Nov. 28, 1916 |
| 1,887,976 | Jensen | Nov. 15, 1932 |
| 1,887,977 | Jensen | Nov. 15, 1932 |
| 1,972,699 | Beck | Sept. 4, 1934 |
| 2,636,423 | Cunningham | Apr. 28, 1953 |